(12) United States Patent
Zhang et al.

(10) Patent No.: US 11,249,597 B2
(45) Date of Patent: Feb. 15, 2022

(54) PIXEL CIRCUIT FOR WRITING, HANDWRITING DISPLAY PANEL AND HANDWRITING DISPLAY SYSTEM

(71) Applicants: BEIJING BOE DISPLAY TECHNOLOGY CO., LTD., Beijing (CN); BOE TECHNOLOGY GROUP CO., LTD., Beijing (CN)

(72) Inventors: Chunbing Zhang, Beijing (CN); Rui Guo, Beijing (CN); Weihao Hu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 566 days.

(21) Appl. No.: 16/304,761

(22) PCT Filed: Apr. 8, 2018

(86) PCT No.: PCT/CN2018/082194
§ 371 (c)(1),
(2) Date: Nov. 27, 2018

(87) PCT Pub. No.: WO2019/024528
PCT Pub. Date: Feb. 7, 2019

(65) Prior Publication Data
US 2021/0223880 A1    Jul. 22, 2021

(30) Foreign Application Priority Data
Aug. 4, 2017 (CN) .......................... 201710662503.9

(51) Int. Cl.
*G06F 3/042* (2006.01)
*G06F 3/041* (2006.01)
*G06F 3/0488* (2013.01)

(52) U.S. Cl.
CPC ............ *G06F 3/042* (2013.01); *G06F 3/0418* (2013.01); *G06F 3/04162* (2019.05); *G06F 3/04883* (2013.01)

(58) Field of Classification Search
CPC ............................. G06F 3/042; G06F 3/04162
See application file for complete search history.

(56) References Cited

U.S. PATENT DOCUMENTS

2005/0134536 A1* 6/2005 Lo ........................ G09G 3/3291
345/76
2005/0237317 A1    10/2005 Cok
(Continued)

FOREIGN PATENT DOCUMENTS

CN         2508982 Y       9/2002
CN         1751333 A       3/2006
(Continued)

OTHER PUBLICATIONS

International Search Report and Written Opinion in corresponding International Patent Application No. PCT/CN2018/082194 dated Jun. 27, 2018 (an English translation attached hereto). 19 pages.
(Continued)

*Primary Examiner* — Chun-Nan Lin
(74) *Attorney, Agent, or Firm* — Leason Ellis LLP

(57) ABSTRACT

A pixel circuit, a handwriting display panel and a handwriting display system are provided. The pixel circuit includes: a write-in control circuit, a light-emitting circuit, a display control circuit and an erasing control circuit. The write-in control circuit includes a photosensitive switch, and the photosensitive switch is capable of being turned on under illumination of first light; the light-emitting circuit includes a first light-emitting component, which is configured to emit the first light to illuminate the photosensitive switch where the photosensitive switch is turned on; the display control circuit includes a display unit, which is configured to per-
(Continued)

form display operation where the photosensitive switch is turned on; and the erasing control circuit includes an induction switch, and the induction switch is controllable to be turned on.

16 Claims, 4 Drawing Sheets

(56) References Cited

U.S. PATENT DOCUMENTS

| | | | |
|---|---|---|---|
| 2006/0145970 A1 | 7/2006 | Krijn et al. | |
| 2006/0292394 A1* | 12/2006 | Iwaki | H01L 51/0052 428/690 |
| 2016/0014870 A1* | 1/2016 | Chen | G09F 13/005 315/149 |
| 2016/0018918 A1 | 1/2016 | Chen | |

FOREIGN PATENT DOCUMENTS

| | | |
|---|---|---|
| CN | 103699264 A | 4/2014 |
| CN | 105144041 A | 12/2015 |
| CN | 106782311 A | 5/2017 |
| CN | 106919293 A | 7/2017 |
| CN | 106920515 A | 7/2017 |
| CN | 107274831 A | 10/2017 |

OTHER PUBLICATIONS

Chinese Office Action in corresponding Chinese Patent Application No. 201710662503.9 dated Mar. 18, 2019 (an English translation attached hereto). 17 pages.

* cited by examiner

PIXEL CIRCUIT FOR WRITING, HANDWRITING DISPLAY PANEL AND HANDWRITING DISPLAY SYSTEM

The present application is a U.S. National Stage Application under 35 U.S.C. § 371 of International Patent Application No. PCT/CN2018/082194, filed Apr. 8, 2018, which claims priority to Chinese patent application No. 201710662503.9, filed on Aug. 4, 2017, both of which are incorporated herein by reference in their entireties.

TECHNICAL FIELD

Embodiments of the present disclosure relate to a pixel circuit, a handwriting display panel and a handwriting display system.

BACKGROUND

A handwriting display device is a device that can record a user's writing track, and can be widely used in many fields such as teaching, commercial display and so on. At present, the handwriting display device on the market is mostly implemented by a principle similar to touch control, and the user's writing track is sensed by changes in capacitance, pressure and so on, thereby presenting the user's writing content.

SUMMARY

At least one embodiment of the present disclosure provides a pixel circuit, which comprises a write-in control circuit, a light-emitting circuit, a display control circuit and an erasing control circuit, the write-in control circuit comprises a photosensitive switch, and the photosensitive switch is capable of being turned on under illumination of first light; the light-emitting circuit comprises a first light-emitting component, and the first light-emitting component is configured to emit the first light to illuminate the photosensitive switch where the photosensitive switch is turned on, so as to allow the photosensitive switch to be turned on continuously; the display control circuit comprises a display unit, and the display unit is configured to perform display operation where the photosensitive switch is turned on; and the erasing control circuit comprises an induction switch, and the induction switch is controllable to be turned on, so as to stop the first light-emitting component from emitting light.

For example, in the pixel circuit provided by at least one embodiment of the present disclosure, the write-in control circuit comprises a first terminal and comprises a second terminal used to be connected with a power supply voltage, and the first light-emitting component, the display control circuit and the erasing control circuit are connected with the first terminal of the write-in control circuit.

For example, the pixel circuit provided by at least one embodiment of the present disclosure further comprises a position signal transmitting circuit, the position signal transmitting circuit comprises a position signal transmitting unit, and the position signal transmitting unit is configured to transmit a position signal of the display unit where the photosensitive switch of the write-in control circuit is turned on.

For example, in the pixel circuit provided by at least one embodiment of the present disclosure, the write-in control circuit comprises a first terminal and comprises a second terminal used to be connected with a power supply voltage, and the position signal transmitting circuit is connected with the first terminal of the write-in control circuit.

For example, the pixel circuit provided by at least one embodiment of the present disclosure further comprises a reset control circuit, the reset control circuit comprises a recovery switch circuit, and the recovery switch circuit is configured to allow the first light-emitting component to emit the first light and allow the position signal transmitting circuit to work where the recovery switch circuit is turned on.

For example, in the pixel circuit provided by at least one embodiment of the present disclosure, the write-in control circuit comprises a first terminal and comprises a second terminal used to be connected with a power supply voltage, and the reset control circuit comprises a first terminal connected with the write-in control circuit and a second terminal connected with a power supply voltage.

For example, in the pixel circuit provided by at least one embodiment of the present disclosure, the position signal transmitting unit is a position light-emitting diode.

At least one embodiment of the present disclosure provides a handwriting display panel, which comprises a plurality of pixel units, and the pixel unit comprises the pixel circuit provided by any one of the embodiments of the present disclosure.

At least one embodiment of the present disclosure provides a handwriting display system, which comprises the handwriting display panel provided by an embodiment of the present disclosure and an erasing device; the erasing device is configured to be capable of allowing the induction switch of the erasing control circuit of the pixel circuit to be turned on, so as to stop the first light-emitting component from emitting light.

For example, in the handwriting display system provided by at least one embodiment of the present disclosure, the erasing device comprises a position signal receiving unit and a position signal storage unit; the erasing device performs an erasing function, the position signal receiving unit is configured to receive a position signal of an extinguished display unit, and the position signal storage unit is configured to store the position signal of the extinguished display unit, and the erasing device recovers a luminous state of the display unit according to the position signal of the extinguished display unit.

For example, in the handwriting display system provided by at least one embodiment of the present disclosure, in a case where the pixel circuit comprises the reset control circuit, the erasing device is configured to perform a recovery instruction where the recovery switch of the reset control circuit is turned on; the erasing device further comprises a control unit; where the erasing device performs the recovery instruction, the control unit is configured to control the induction switch of the pixel unit which previously does not emit light to be turned on according to the position signal stored in the position signal storage unit and the position signal transmitted by the position signal transmitting unit, so as to turn off the display unit which previously does not emit light.

For example, in the handwriting display system provided by at least one embodiment of the present disclosure, the induction switch is a photosensitive thin film transistor or a photosensitive diode, and the photosensitive thin film transistor or the photosensitive diode is capable of being turned on under illumination of second light; the display panel comprises a plurality of regions, each of the regions comprises a plurality of pixel units; kinds of position signals emitted by the plurality of pixel units comprised in each of the regions are different, and kinds of the required second light which turn on induction switches of the plurality of pixel units in each of the regions are different.

For example, in the handwriting display system provided by at least one embodiment of the present disclosure, each of the regions comprises four pixel units, the four pixel units comprised in each of the regions are in a same arrangement, and where the erasing device contacts the display panel, the erasing device is configured to at most contact four pixel units simultaneously.

For example, in the handwriting display system provided by at least one embodiment of the present disclosure, the erasing device further comprises an erasing electrode and a second light-emitting component; the erasing electrode comprises a first electrode, a second electrode and a spring, and the spring is configured to allow the first electrode and the second electrode to be separate; where the erasing device contacts the display panel and allows the spring to be compressed, the first electrode is configured to contact the second electrode, the erasing electrode is configured to be turned on, and the second light-emitting component emits the second light.

For example, the handwriting display system provided by at least one embodiment of the present disclosure further comprises a handwriting pen, the handwriting pen comprises a contact electrode and a third light-emitting component, and the third light-emitting component is configured to emit the first light where the contact electrode is turned on.

For example, in the handwriting display system provided by at least one embodiment of the present disclosure, the handwriting pen further comprises a pen point and an extending electrode; where the pen point contacts the display panel, the pen point is configured to push the extending electrode to contact the contact electrode, so that the contact electrode is turned on, and the third light-emitting component emits the first light.

For example, in the handwriting display system provided by at least one embodiment of the present disclosure, the handwriting pen further comprises a press button, and the press button is configured to turn on the contact electrode where the press button is closed.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
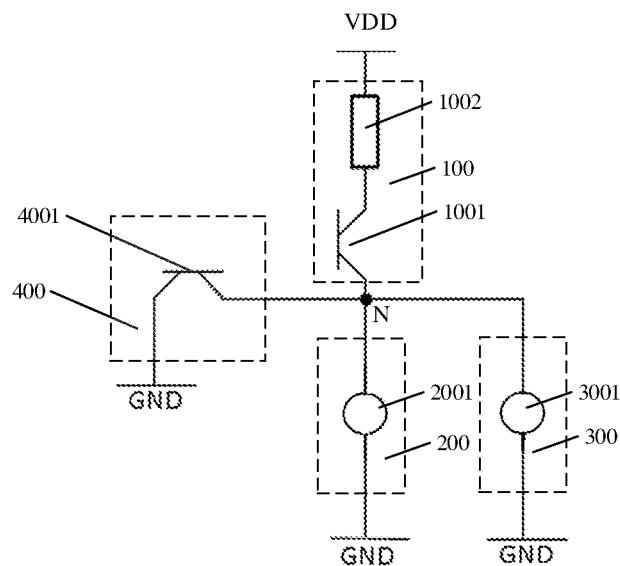
FIG. 1 is a schematic diagram of a pixel circuit provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "left," "right" and the like are only used to indicate relative position relationship, and when the position of the object which is described is changed, the relative position relationship may be changed accordingly.

Inventors of the present disclosure have found in the research that the handwriting display device currently on the market is difficult to realize multi-point writing simultaneously, and where writing errors occur, the erroneous content cannot be effectively erased and corrected.

At least one embodiment of the present disclosure provides a pixel circuit, which comprises a write-in control circuit, a light-emitting circuit, a display control circuit and an erasing control circuit, the write-in control circuit comprises a photosensitive switch, and the photosensitive switch is capable of being turned on under illumination of first light; the light-emitting circuit comprises a first light-emitting component, and the first light-emitting component is configured to emit the first light to illuminate the photosensitive switch where the photosensitive switch is turned on, so as to allow the photosensitive switch to be turned on continuously; the display control circuit comprises a display unit, and the display unit is configured to perform display operation where the photosensitive switch is turned on; and the erasing control circuit comprises an induction switch, and the induction switch is controllable to be turned on, so as to stop the first light-emitting component from emitting light.

At least one embodiment of the present disclosure provides a handwriting display panel, which comprises a plurality of pixel units, and the pixel units each comprises any one of the above pixel circuits.

At least one embodiment of the present disclosure provides a handwriting display system, which comprises the above handwriting display panel and an erasing device; the erasing device is configured to be capable of allowing the induction switch of the erasing control circuit of the pixel circuit to be turned on, so as to stop the first light-emitting component from emitting light, realizing erasing function.

The pixel circuit, the handwriting display device and the handwriting display system of the present disclosure will be described in the following through several specific embodiments.

At least one embodiment of the present disclosure provides a pixel circuit, and the pixel circuit, for example, can be used for a handwriting display panel. The handwriting display panel comprises a plurality of pixel units, and can have functions of write-in, erasing and so on.

As illustrated in FIG. 1, the pixel circuit comprises a write-in control circuit 100, a light-emitting circuit 200, a display control circuit 300 and an erasing control circuit 400. The write-in control circuit 100 comprises a photosensitive switch 1001, and the photosensitive switch 1001 is capable of being turned on under illumination of first light, the first light is of a first predetermined wavelength; the light-emitting circuit 200 comprises a first light-emitting component 2001, and the first light-emitting component 2001 is configured to emit the first light to illuminate the photosensitive switch 1001 where the photosensitive switch 1001 is turned on, so as to allow the photosensitive switch 1001 to be turned on continuously; the display control circuit 300 comprises a display unit 3001, and the display unit 3001 is configured to perform display operation where the photosensitive switch 1001 is turned on; the erasing control circuit 400 comprises an induction switch 4001, and the induction switch 4001 is controllable to be turned on, so as to stop the first light-emitting component 2001 from emitting light.

In the embodiment, as illustrated in FIG. 1, the write-in control circuit 100 may comprise a first terminal and comprise a second terminal that is used to be connected with a power supply voltage (e.g. an operating voltage VDD), and the first terminal, for example, is an output terminal of the write-in control circuit 100. The light-emitting circuit 200 and the display control circuit 300 obtain the power supply voltage from the write-in control circuit 100, and therefore first terminals of the light-emitting circuit 200 and the display control circuit 300 are connected with the first terminal of the write-in control circuit 100, and another terminals (i.e. second terminals) of the light-emitting circuit 200 and the display control circuit 300 are connected with another power supply voltage (e.g. a common voltage or a low voltage, such as GND); the erasing control circuit 400 is used to allow the light-emitting circuit 200 to stop light-emitting operation and/or allow the display control circuit 300 to stop display operation, thus a first terminal of the erasing control circuit 400 is connected with the light-emitting circuit 200 and the display control circuit 300, and another terminal (a second terminal) is connected with another power supply voltage (e.g. a common voltage or a low voltage, such as GND).

In the specific embodiment as illustrated in FIG. 1, for example, the light-emitting circuit 200, the display control circuit 300 and the erasing control circuit 400 are connected with the write-in control circuit 100 through a node N, so as to apply the power supply voltage VDD to the light-emitting circuit 200 and the display control circuit 300 where the write-in control circuit 100 is turned on, and apply another power supply voltage (e.g. GND) to the light-emitting circuit 200 and the display control circuit 300 where the erasing control circuit 400 is turned on, thereby allowing the light-emitting circuit 200 and the display control circuit 300 to stop operation.

More specifically, for example, one terminal of the first light-emitting component 2001 of the light-emitting circuit 200, one terminal of the display unit 3001 of the display control circuit 300 and one terminal of the induction switch 4001 of the erasing control circuit 400 are connected with the photosensitive switch 1001 of the write-in control circuit 100, and another terminal of the light-emitting circuit 200, another terminal of the display control circuit 300 and another terminal of the erasing control circuit 400, for example, are connected with GND.

In the embodiment, in the write-in control circuit 100, in addition to the photosensitive switch 1001, functional components such as a resistor 1002 can be provided as needed. The photosensitive switch 1001, for example, can be a photosensitive thin film transistor or a photosensitive diode, and the photosensitive thin film transistor or the photosensitive diode can be configured to be turned on under illumination of the first light. The first light, for example, can be an invisible light, such as an infrared light with a certain wavelength or an ultraviolet light, in this case, users cannot see the required first light that allows the photosensitive switch 1001 to be turned on through naked eyes, so as to prevent the first light from affecting the display effect of the display unit 3001. In some examples of the embodiment, the first light can also be a laser of a certain color.

In the embodiment, the first light-emitting component 2001, for example, can be a light-emitting diode, such as an organic light-emitting diode or an inorganic light-emitting diode. The light-emitting diode is capable of emitting the first light. The first light-emitting component 2001 can be disposed near the photosensitive switch 1001, so as to allow the first light-emitting component 2001 to emit the first light to illuminate the photosensitive switch 1001 where the photosensitive switch 1001 is turned on, so that the photosensitive switch 1001 can be continuously turned on, thus the first light-emitting component 2001 can also continuously emit light.

In the embodiment, the display unit 3001, for example, can be a display unit of an appropriate type, and can be an active display unit or a passive display unit, such as comprising an organic light-emitting diode display device, an electrochromic display device, an electronic ink display device, a liquid crystal display device and the like. The driving circuit is powered through the write-in control circuit.

For example, where the display unit 3001 comprises an organic light-emitting diode display device, the organic light-emitting diode display device can emit a visible light of a certain color that is visible to the user during operation, for example, the visible light may be white light or red light, green light, blue light and the like. The organic light-emitting diode display device can comprise an organic light-emitting diode and a corresponding driving circuit.

For example, where the display unit 3001 comprises an electrochromic display device, for example, the electrochromic display device can comprise a backlight and an electrochromic layer that is located on a light-emitting surface of the backlight, for example, electrodes are disposed on both sides of the electrochromic layer to apply an electric field, and color of the electrochromic layer can be changed under control of the applied electric field, for example, the color may be changed between colorless color and some dark color, thus the color change of the electrochromic layer can adjust an emitting amount of light emitted by the backlight, so that light of different intensities that is visible to the user is displayed.

For example, where the display unit 3001 comprises an electronic ink display device, for example, color of an electronic ink layer of the electronic ink display device can be changed under control of an electrical signal, for example, the color may be changed between black and white, thus different colors which are visible to the user are displayed under control of the electrical signal.

For example, where the display unit 3001 comprises a liquid crystal display device, for example, the liquid crystal display device can be a vertical electric field type or a horizontal electric field type, and can comprise a backlight and a stack of a first polarizer, a liquid crystal layer and a second polarizer on a light-emitting surface of the backlight. Polarization axes of the first polarizer and the second polarizer are perpendicular to each other, the liquid crystal layer is capable of controlling a rotation angle of liquid crystals therein by an applied electric field, thus an emitting amount of light emitted by the backlight are adjusted through the cooperation of the first polarizer, the liquid crystal layer and the second polarizer, and light of different intensities that is visible to the user is displayed.

In the embodiment, the erasing control circuit 400 is connected between a power supply voltage (e.g. GND) and the light-emitting circuit 200. Where the erasing control circuit 400 is turned on, that is, where the induction switch 4001 of the erasing control circuit 400 is controlled to be turned on, both terminals of the light-emitting circuit 200 are applied with the same voltage (GND), and the light-emitting circuit 200 stops emitting light, and both terminals of the display control circuit 300 are applied with the same voltage (GND), and the display control circuit 300 stops displaying, that is, the corresponding display is "erased", and the photosensitive switch 1001 of the write-in control circuit 100 is also turned off. The induction switch 4001, for example, can be a photosensitive thin film transistor, a photosensitive diode, a piezoelectric induction thin film transistor or the like. Where the induction switch 4001 is a photosensitive thin film transistor or a photosensitive diode, the induction switch 4001, for example, can be turned on under illumination of second light, the second light is of a second predetermined wavelength, and the second light can be the same as or different from the first light described above. For example, in a case where the second light is the same as the first light described above, a switch component (not shown) can be provided between the erasing control circuit 400 and the light-emitting circuit 200, so as to disconnect the erasing control circuit 400 from the light-emitting circuit 200 during a write-in state and electrically connect the erasing control circuit 400 with the light-emitting circuit 200 during an erasing state to avoid the crosstalk. Where the induction switch 4001 is a piezoelectric induction thin film transistor, the piezoelectric induction thin film transistor, for example, is a metal-insulator-piezoelectrics-semiconductor (MIPS) transistor, comprising a piezoelectric material disposed between a semiconductor layer and an insulating layer, and the transistor is capable of being switched between an on state and an off state under pressure.

For example, where the pixel circuit is used for a handwriting display panel, the photosensitive switch 1001 of the control circuit 100 of the pixel circuit can be turned on under illumination of the first light, and the first light-emitting component 2001 can emit the first light and illuminate the photosensitive switch 1001 to allow the photosensitive switch 1001 to be turned on continuously, so that the first light-emitting component 2001 can continuously emit light. In addition, where the photosensitive switch 1001 is turned on, the display unit 3001 of the display control circuit 300 emits light, so as to display the writing content and implement the writing function. Where it is required to erase the writing content, the control induction switch 4001 is turned on, so as to allow the erasing control circuit 400 to be turned on and allow the light-emitting circuit 200 and the display control circuit 300 to be turned off, so that the first light-emitting component 2001 and the display unit 3001 are both turned off, and the erasing function is realized.

Figure 2:
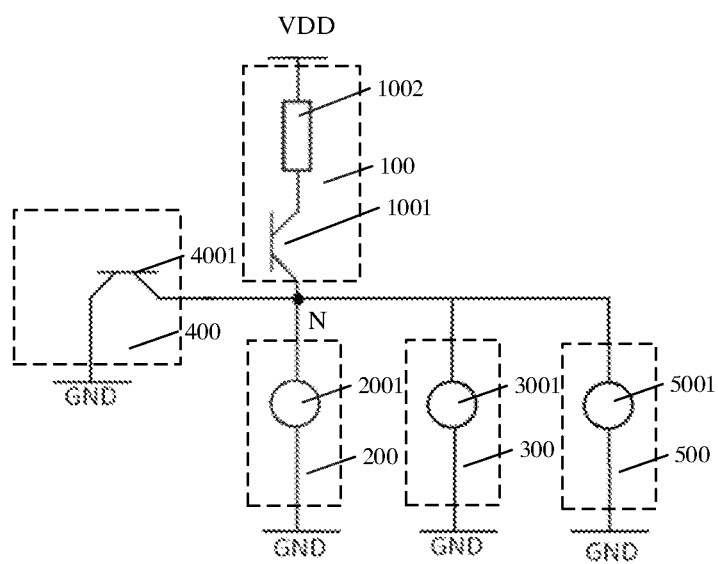
FIG. 2 is a schematic diagram of a pixel circuit provided by another embodiment of the present disclosure.

In another example of the embodiment, as illustrated in FIG. 2, the pixel circuit can further comprise a position signal transmitting circuit 500, and the position signal transmitting circuit 500 comprises a position signal transmitting unit 5001, which is configured to emit a position signal of the display unit 3001 where the photosensitive switch 1001 of the write-in control circuit 100 is turned on. For example, the position signal transmitting circuit 500 is also connected between the node N and another power supply voltage (e.g. GND). For example, one terminal of the position signal transmitting circuit 500 can be connected with the photosensitive switch 1001 of the write-in control circuit 100, and another terminal of the position signal transmitting circuit 500, for example, can be connected with the GND. In the embodiment, the position signal transmitting unit 5001, for example, can be a position light-emitting diode, and the position light-emitting diode can emit a position signal of the display unit 3001 where the photosensitive switch 1001 is turned on, and the position signal, for example, is a third light, the third light is of a third predetermined wavelength. The third light can be the same as or different from the first light and the second light, and if they are the same, it is required that the third light does not illuminate the photosensitive switch 1001 and the induction switch 4001.

Figure 3:
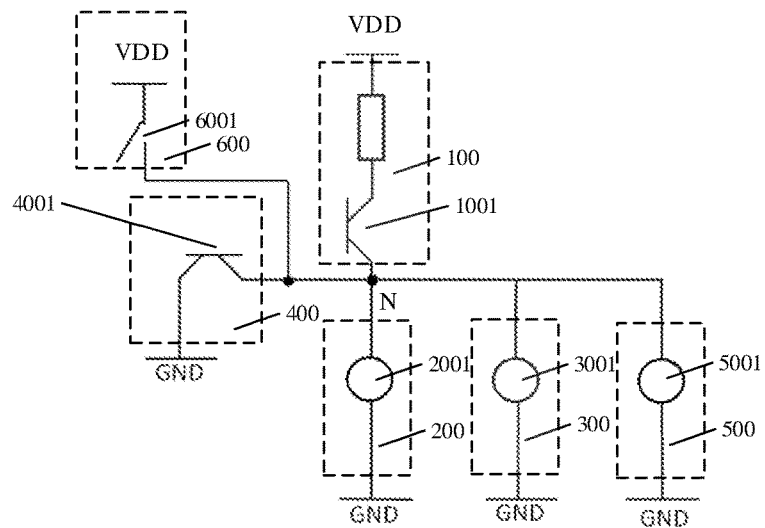
FIG. 3 is a schematic diagram of a pixel circuit provided by still another embodiment of the present disclosure.

In still another example of the embodiment, as illustrated in FIG. 3, the pixel circuit, for example, can further comprise a reset control circuit 600, and the reset control circuit 600 comprises a recovery switch circuit 6001, and the reset control circuit 600 is configured that the first light-emitting component 2001 emits the first light and the position signal transmitting circuit 500 operates where the recovery switch circuit 6001 is turned on, that is, where the recovery switch circuit 6001 is turned on, the first light-emitting component 2001 emits the first light to illuminate the photosensitive switch 1001, so as to allow the photosensitive switch 1001 to be turned on, thereby the display unit 3001 emits light and the position signal transmitting unit 5001 emits the position signal of the display unit 3001.

For example, one terminal of the reset control circuit 600 is connected with a power supply voltage (e.g. a high voltage terminal VDD), and another terminal is connected with the light-emitting circuit 200, so that the power supply voltage can be applied to the light-emitting circuit 200 where the reset control circuit 600 is turned on. For example, one terminal of the recovery switch circuit 6001 of the reset control circuit 600 can be connected with the power supply voltage VDD, and another terminal of the recovery switch circuit 6001 can be connected with the node N or other suitable positions, so where the recovery switch circuit 6001 is turned on, the first light-emitting component 2001 can also continuously emit light, and the display unit 3001 of the display control circuit 300 can display. In the embodiment, the reset control circuit 600 can be shared by a plurality of pixel circuits, for example, one terminal of the recovery switch circuit 6001 of the reset control circuit 600 is connected with the power supply voltage VDD and another terminal of the recovery switch circuit 6001 is connected with the plurality of pixel circuits, and therefore where the reset control circuit 600 is turned on, the first light-emitting components of the plurality of pixel circuits that are connected with the reset control circuit 600 are all reset.

In the embodiment, the recovery switch circuit 6001, for example, can be a mechanical switch or a switch circuit. The switch circuit, for example, is a switch transistor and the like, and the switch transistor is controllable to be turned on. For example, the recovery switch circuit 6001 can be turned on under an external force or under control of an electrical signal.

Figure 4A:
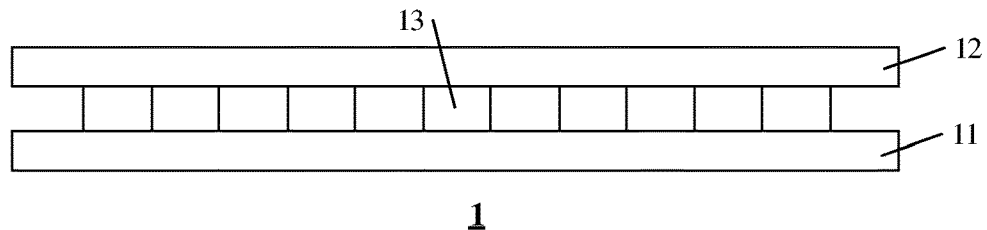
FIG. 4A is a schematic diagram of a handwriting display panel provided by an embodiment of the present disclosure.

At least one embodiment of the present disclosure provides a handwriting display panel, as illustrated in FIG. 4A, the handwriting display panel 1 comprises a plurality of pixel units 13, and each of the pixel units 13 comprises the pixel circuit provided by the embodiment of the present disclosure. In the embodiment, the handwriting display panel 1 can further comprise a first substrate 11 and a second substrate 12 which are opposite to each other. The first substrate 11, for example, can be a support substrate made of a material such as glass, quartz, plastic and so on. For example, a circuit used for the pixel unit 13 and so on may be formed on the first substrate 11. The second substrate 12, for example, can be a substrate made of a transparent material such as glass, plastic and so on, so as to better display the writing content. In addition, the first substrate 11 and the second substrate 12 can be flexible substrates, for example, flexible substrates made of polyimide (PI) and so on, which is not limited in the embodiment.

In the embodiment, the photosensitive switches 1001 of the plurality of pixel units comprised in the handwriting display panel 1 can be turned on under illumination of the first light, so as to allow the pixel units to emit light. Because the first light-emitting component 2001 comprised in the pixel unit can emit the first light and illuminate the photosensitive switch 1001 to allow the photosensitive switch 1001 to be turned on continuously where the photosensitive switch 1001 is turned on, that is, the photosensitive switch 1001 of the pixel unit of the handwriting display panel 1 can allow the pixel unit to emit light continuously after a short illumination of the first light. If the light-emitting state of each pixel unit of the handwriting display panel 1 is independent, the handwriting display panel 1 can realize multi-point writing.

For example, where the display unit is an organic light-emitting diode display device, an electrochromic display device, an electronic ink display device, a liquid crystal display device or the like, the handwriting display panel 1 can be implemented as an organic light-emitting diode display panel, an electrochromic display panel, an electronic ink display panel, a liquid crystal display panel or the like.

Figure 4B:
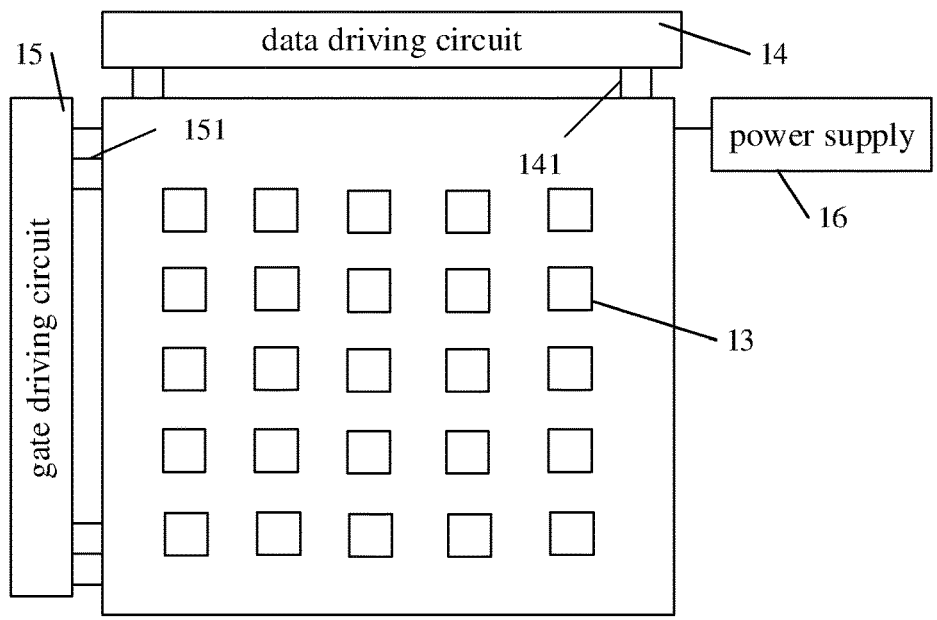
FIG. 4B is a schematic diagram of a circuit connection in a handwriting display panel provided by an embodiment of the present disclosure.

For example, as illustrated in FIG. 4B, where the handwriting display panel 1 is the above display panel such as the organic light-emitting diode display panel and so on, the handwriting display panel 1 can further comprise a data driving circuit 14 and a gate driving circuit 15, which are respectively used for providing a data signal and a gate signal. The data driving circuit 14 is electrically connected with the plurality of pixel units 13 comprised in the handwriting display panel 1 through data lines 141, and the gate driving circuit 15 is electrically connected with the pixel units 13 through gate lines 151. Accordingly, the display unit of the pixel unit 13 is an organic light-emitting diode display device, an electrochromic display device, an electronic ink display device, a liquid crystal display device or the like. In addition, the handwriting display panel 1 can further comprise other functional components such as a power supply 16 (to provide an operating voltage VDD), which is not described in detail in the embodiment.

Figure 5:
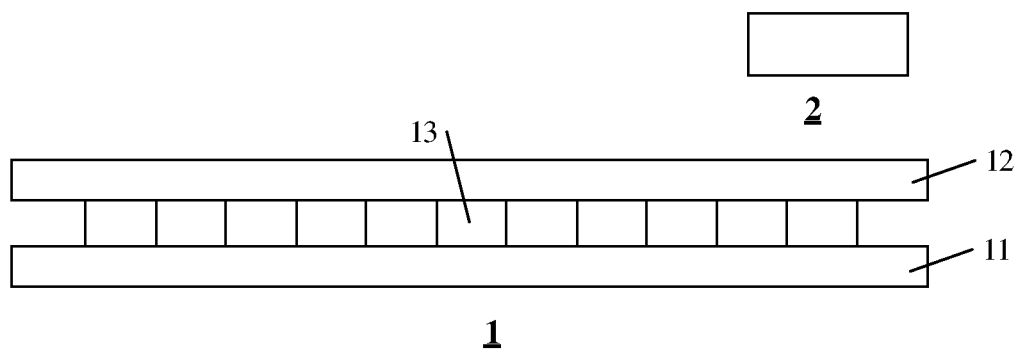
FIG. 5 is a schematic diagram of a handwriting display system provided by an embodiment of the present disclosure.

At least one embodiment of the present disclosure provides a handwriting display system, as illustrated in FIG. 5, the handwriting display system comprises the above handwriting display panel 1 and an erasing device 2. The erasing device 2 is configured to allow the induction switch of the erasing control circuit of the pixel circuit to be turned on, so as to stop the first light-emitting component of the pixel circuit from emitting light and implement the erasing function. The erasing device 2, for example, can be realized in a form of an eraser, for example, the erasing device 2 can be in a flat cuboid shape.

For example, where the induction switch of the erasing control circuit of the pixel circuit of the handwriting display panel 1 is a photosensitive thin film transistor or a photosensitive diode, and the photosensitive thin film transistor or the photosensitive diode can be turned on under illumination of the second light, the erasing device 2 is configured to be capable of emitting the second light, so as to allow the induction switch to be turned on, for example, the erasing device 2 can comprise a light-emitting diode to emit the second light. For another example, where the induction switch is a piezoelectric induction thin film transistor, the erasing device 2 can be configured to apply a force to the piezoelectric induction thin film transistor, so as to allow the induction switch to be turned on. Therefore, during a using process, if a part of the display content is no longer needed, the user can use the above erasing device to sweep the display panel to erase the display content.

Figure 6:
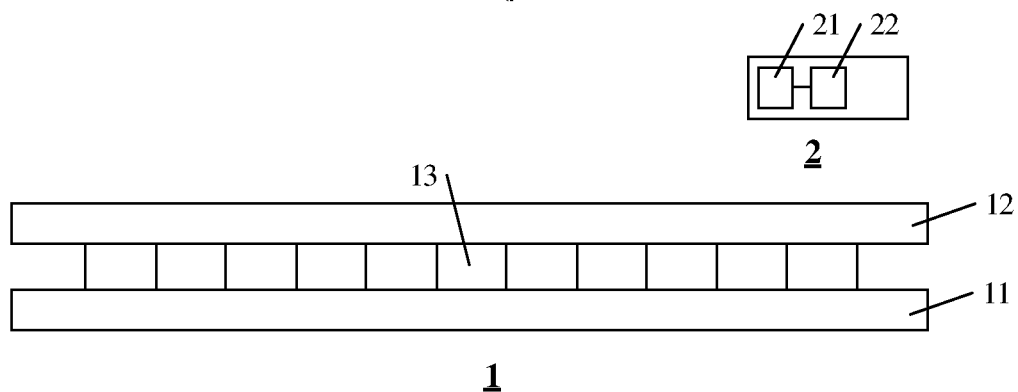
FIG. 6 is a schematic diagram of a handwriting display system provided by another embodiment of the present disclosure.

In an example of the embodiment, the erasing device 2 can further have an erasing recovery function, so where the user erases the needed writing content by mistake, the erasing device 2 is also capable of recovering the needed writing content. For example, as illustrated in FIG. 6, the erasing device 2 can comprise a position signal receiving unit 21 and a position signal storage unit 22. Where the erasing device 2 performs an erasing function, the position signal receiving unit 21 is configured to receive the position signal of the extinguished display unit of the handwriting display panel 1, and the position signal storage unit 22 is configured to store the position signal of the extinguished display unit of the handwriting display panel 1, and then, if needed, the erasing device 2 can recover the luminous state of the display unit according to the position signal of the extinguished display unit, and implement the recovery function. For example, the position signal receiving unit 21 can comprise a photosensitive diode and the like, and the position signal storage unit 22 can comprise, for example, any circuit or medium that has an information storage function, such as a semiconductor storage medium, a magnetic storage medium and the like.

Figure 7:
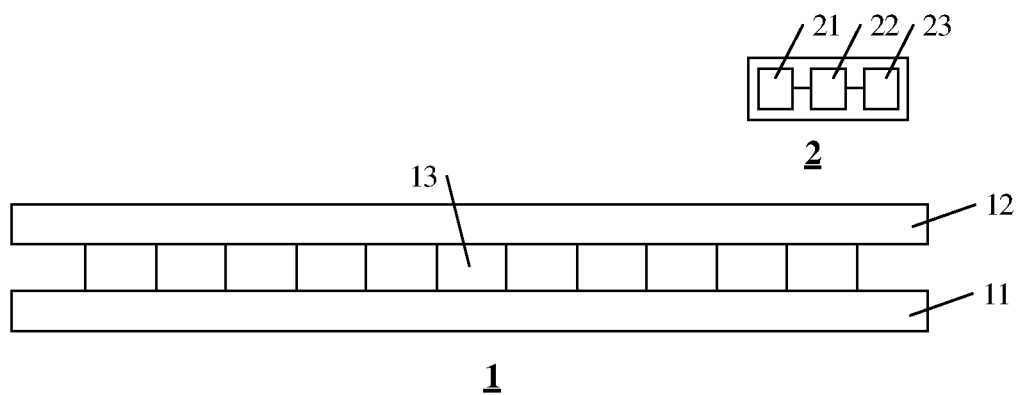
FIG. 7 is a schematic diagram of a handwriting display system provided by still another embodiment of the present disclosure.

For example, where the pixel circuit of the pixel unit of the handwriting display panel 1 of the embodiment comprises the reset control circuit, the erasing device 2 is configured to perform a recovery instruction where the recovery switch circuit of the reset control circuit is turned on. Where the recovery switch circuit of the reset control circuit is turned on, the display unit of the pixel unit operates, and the position signal transmitting unit transmits the position information of the display unit. In this case, as illustrated in FIG. 7, the erasing device 2 can further comprise a control unit 23. Where the erasing device 2 implements the erasing recovery function according to the position signal stored in the position signal storage unit 22 and the position signal of the display unit transmitted by the position signal transmitting unit, the control unit 23 is configured to control the induction switch of the pixel unit which previously does not emit light to be turned on, so as to turn off the display unit which previously does not emit light, and recover the luminous state of the display unit. The control unit 23, for example, can be a control circuit and so on.

Figure 8:
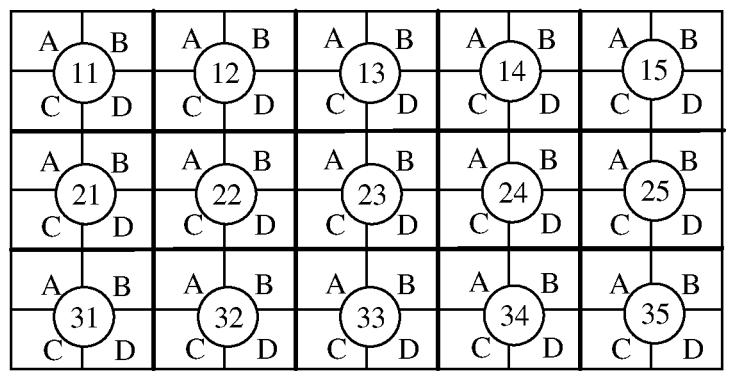
FIG. 8 is a schematic diagram of a handwriting display system comprising regions provided by an embodiment of the present disclosure.

In an example of the embodiment, as illustrated in FIG. 8, the handwriting display panel 1 comprises a plurality of regions, each region comprises a plurality of pixel units, and kinds of position signals emitted by the plurality of pixel units comprised in each of the regions are different from each other, and kinds of the required signals that allow induction switches of the plurality of pixel units in each of the regions to be turned on are different from each other. For example, in the present example, the handwriting display panel 1 comprises a plurality of regions such as 11, 12, 13, . . . 34, 35, etc., each region comprises four pixel units, the kind of the position signal of each of the four pixel units is different from each other, and the kind of the required signal that allows the induction switch of each of the four pixel units to be turned on is different from each other. For example, the position signal of each pixel unit comprises a coordinate signal and a kind signal, the coordinate signals are 11, 12, 13, . . . 34, 35, etc., and the kind signals are four kind signals A*, B*, C* and D* which respectively correspond to the four positions A, B, C and D of each region. The position signal of each pixel unit comprises one coordinate signal and one kind signal, and therefore the position signal of each pixel unit is different. In this case, in the four pixel units of one region, the kind of the required signal that turns on the induction switch of each pixel unit is different, for example, where the induction switches of four positions A, B, C and D of each region are photosensitive thin film transistors or photosensitive diodes, the kind of the required second light that turns on the photosensitive thin film transistor or the photosensitive diode of each of the four positions A, B, C and D is different, for example, photosensitive thin film transistors or photosensitive diodes of each of the four positions A, B, C and D respectively need the light of wavelengths λ1, λ2, λ3 and λ4 to be turned on. In the embodiment, the four pixel units of each region are in a same arrangement, for example, in the plurality of regions of the handwriting display panel 1, the four pixel units are all arranged in a 2×2 arrangement, and the arrangements of four positions A, B, C and D are the same, so the position kind signals of two adjacent positions are different from each other, and the kinds of the required optical signals which turn on the induction switches of two adjacent positions are different from each other, so as to avoid signal crosstalk between adjacent pixel units. In the embodiment, the erasing device 2 is configured to at most contact four pixel units simultaneously where the erasing device 2 contacts the handwriting display panel 1 to implement the erasing or recovery function. Therefore, where the erasing device 2 emits the required second light that turns on the induction switches corresponding to the four positions A, B, C and D, the signal crosstalk does not occur.

For example, the size of the erasing device 2 or the size of the contact area between the erasing device 2 and the handwriting display panel 1 during operation can be matched according to the size of each region of the handwriting display panel 1.

Figure 9:
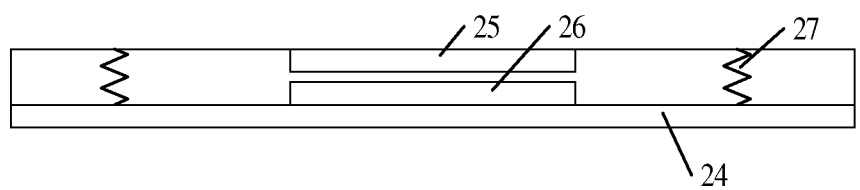
FIG. 9 is a schematic diagram of an erasing device provided by an embodiment of the present disclosure.

In the embodiment, as illustrated in FIG. 9, the portion of the erasing device 2 that contacts the handwriting display panel 1 (the case where the bottom surface of the erasing device 2 can be in contact with the handwriting display panel 1 is illustrated in the figure), for example, can comprise an erasing electrode and at least one second light-emitting component 24, the number of the second light-emitting component 24 can be selected as needed, and where the erasing electrode is turned on, the second light-emitting component 24 can emit the second light according to requirements. The erasing electrode, for example, can comprise a first electrode 25 which is fixed on a top surface of the erasing device 2 and a second electrode 26 which is fixed on a bottom surface of the erasing device 2. The erasing device 2 can further comprise a spring 27, and the spring 27 supports the top surface and the bottom surface of the erasing device 2, so as to allow the first electrode 25 and the second electrode 26 to be separate. Where the erasing device 2 contacts the handwriting display panel 1 and allows the spring 27 to be compressed, the first electrode 25 is configured to contact the second electrode 26, the erasing electrode is configured to be turned on, and the second light-emitting component 24 emits the second light, such as light with wavelength λ1, λ2, λ3 or λ4. Structures such as the position signal receiving unit 21, the position signal storage unit 22, the control unit 23 and so on comprised in the erasing device 2 are inside the erasing device 2, and are not illustrated in the figure.

For example, where the erasing device 2 erases a part of the writing content at positions 12, 13, 22, 23 (each position comprises four pixel units A, B, C and D) of the handwriting display panel 1 by mistake, because the position signal receiving unit 21 of the erasing device 2 receives the position information of the pixel unit where the writing content exists at the positions 12, 13, 22, 23, and the position signal storage unit 22 of the erasing device 2 stores the position information of the pixel unit, the erasing device 2 can recover the writing content that is erased by mistake according to the position information. First, the recovery switch circuit of the reset control circuit of the pixel circuits at the positions 12, 13, 22, 23 is turned on. For example, a plurality of regions of the handwriting display panel 1 share a reset control circuit, for example, the pixel units of a plurality of regions share a reset control circuit, so where the recovery switch circuit of the reset control circuit is turned on, the pixel units of the plurality of regions controlled by the reset control circuit can emit light. In the embodiment, for example, the pixel circuits at the positions 12, 13, 22, 23 share a reset control circuit, so where the recovery switch circuit of the reset control circuit of the pixel circuits at the positions 12, 13, 22, 23 is turned on, all the pixel units at the positions 12, 13, 22, 23 of the handwriting display panel 1 emit light, and the position signal transmitting units of the pixel units that emit light transmit the position signal. Where the erasing device 2 contacts the handwriting display panel 1, the erasing device 2 performs a recovery instruction, and the control unit 23 of the erasing device 2 matches the stored position information of the writing content at the positions 12, 13, 22, 23 with the position signal transmitted by the position signal transmitting unit of the pixel unit that emits light, so as to control the second light-emitting component 24 of the erasing device 2 to emit the corresponding required light that allows the induction switch of the pixel unit that previously does not emit light at the positions 12, 13, 22, 23 to be turned on, for example, where the pixel units which previously do not emit light are 12B and 12D, and the erasing device 2 contacts the positions of the pixel units 12B and 12D of the handwriting display panel 1, the control unit 23 controls the second light-emitting component 24 to emit the required light, for example, light with a wavelength of λ2 and λ4, which correspondingly allows the induction switches of the pixel units 12B and 12D to be turned on, so as to turn off the pixel units 12B and 12D which previously do not emit light, while the pixel unit that previously emits light still emits light, so that the writing content is recovered.

In the embodiment, the number of the pixel units comprised in each region of the handwriting display panel 1 can be adjusted according to requirements, which is not limited in the embodiment. In the embodiment, the handwriting display panel 1 being divided into a plurality of regions can reduce the kinds of the position signal transmitting units and the induction switches, so as to reduce the production cost of the components.

Figure 10:
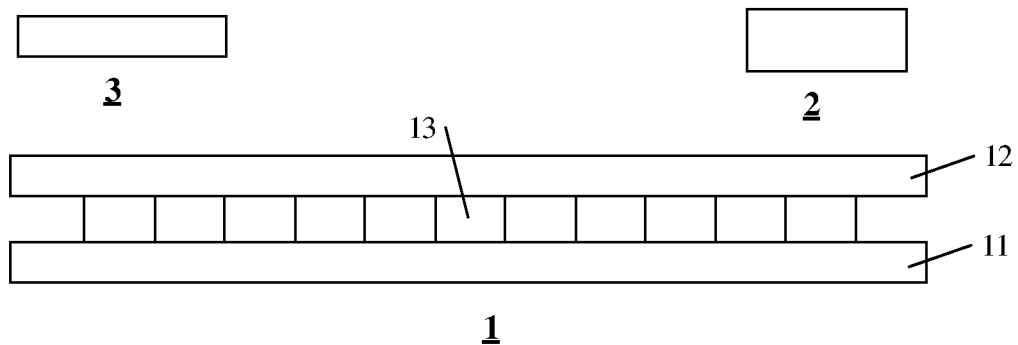
FIG. 10 is a schematic diagram of a handwriting display system provided by still another embodiment of the present disclosure.
Figure 11:
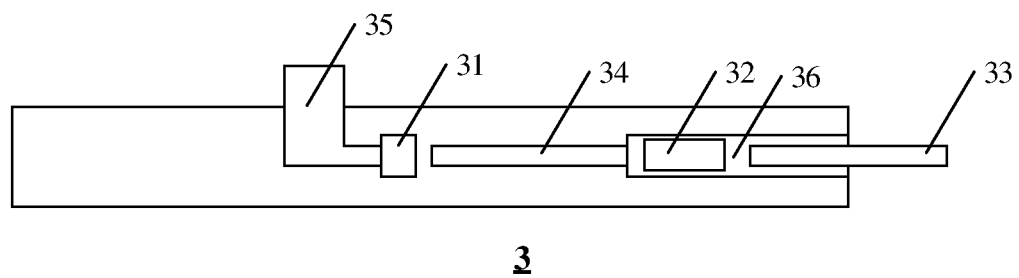
FIG. 11 is a schematic diagram of a handwriting pen provided by an embodiment of the present disclosure.

In the embodiment, as illustrated in FIG. 10, the handwriting display system further comprises a handwriting pen 3, and the handwriting pen 3 can emit the first light as needed. In an example, as illustrated in FIG. 11, the handwriting pen 3 comprises a contact electrode 31 and a third light-emitting component 32, and the handwriting pen 3 is configured that where the contact electrode 31 is turned on, the third light-emitting component 32 emits the first light, so as to allow the photosensitive switch of the pixel unit of the handwriting display panel 1 to be turned on and allow the display unit of the pixel unit to emit light, and therefore the writing content is displayed. The third light-emitting component 32, for example, is a light-emitting diode.

In the embodiment, the handwriting pen 3 can further comprise a pen point 33 and an extending electrode 34, and where the pen point 33 contacts the handwriting display panel 1 and applies a force, the pen point 33 is configured to push the extending electrode 34 to contact the contact electrode 31, so as to allow the contact electrode 31 to be turned on and allow the third light-emitting component 32 to emit the first light.

In the embodiment, as illustrated in FIG. 11, the handwriting pen 3, for example, can further comprise a press button 35, and the press button 35 is configured that where the press button 35 is closed, the contact electrode 31 is turned on, so as to allow the third light-emitting component 32 to emit the first light. For example, where the press button 35 is closed to allow the contact electrode 31 to contact the extending electrode 34, the contact electrode 31 is turned on, and the third light-emitting component 32 emits the first light. In the embodiment, the luminous state of the third light-emitting component 32 can be controlled by the press button 35 instead of using the pen point 33 to contact the handwriting display panel 1, and therefore the handwriting pen 3 can realize long-distance writing without contacting the display panel, that is, the press button 35 is closed to allow the third light-emitting component 32 to emit the first light and illuminate the handwriting display panel 1, so as to perform the long-distance writing operation.

In the embodiment, the handwriting pen 3, for example, can further comprise other auxiliary structures such as a telescopic electrode 36 and so on, and the elastic electrode 36 can be a compressed spring and so on, so as to buffer the force generated by the pen point 33 contacting the handwriting display panel 1. In addition, the elastic electrode 36 can be conductive, and where the contact electrode 31 is turned on, the third light-emitting component 32 is allowed to emit light.

The following points need to be noted:

(1) The drawings of the present disclosure only relate to the structure related to the embodiments of the present disclosure, and other structures can be referred to the general design.

(2) In order to clearly illustrate, in the drawings of the embodiments of the present disclosure, the thickness of the layer or the region is zoomed in or out, that is, the drawings are not drawn according to the actual scale. It will be understood that where a component such as a layer, a film, a region or a substrate is referred to as being "on" or "under" another component, the component can be "directly" positioned "on" or "under" another component or there can be an intermediate component.

(3) In case of no conflict, the embodiments of the present disclosure and the features of the embodiments can be in conjunction with each other to obtain a new embodiment.

The above descriptions are only specific embodiments of the present disclosure, but the protection scope of the present disclosure is not limited thereto, those skilled in the art may make some improvements and modifications within the technical scope of the present disclosure, and the improvements and modifications should be within the protection scope of the present disclosure. Therefore, the protection scope of the present disclosure should be determined by the protection scope of the claims.

What is claimed is:

1. A pixel circuit, comprising: a write-in control circuit, a light-emitting circuit, a display control circuit and an erasing control circuit,
   wherein the write-in control circuit comprises a photosensitive switch, and the photosensitive switch is capable of being turned on under illumination of first light;
   the light-emitting circuit comprises a first light-emitting component, and the first light-emitting component is configured to emit the first light to illuminate the photosensitive switch where the photosensitive switch is turned on;
   the display control circuit comprises a display unit, and the display unit is configured to perform display operation where the photosensitive switch is turned on; and
   the erasing control circuit comprises an induction switch, and the induction switch is controllable to be turned on, to stop the first light-emitting component from emitting light;
   the pixel circuit further comprises a position signal transmitting circuit,
   wherein the position signal transmitting circuit comprises a position signal transmitting unit, and the position signal transmitting unit is configured to transmit a position signal of the display unit where the photosensitive switch of the write-in control circuit is turned on;
   the pixel circuit further comprises a reset control circuit, wherein the reset control circuit comprises a recovery switch circuit, and
   the recovery switch circuit is configured to allow the first light-emitting component to emit the first light and allow the position signal transmitting circuit to work where the recovery switch circuit is turned on;
   the write-in control circuit comprises a first terminal and a second terminal, the second terminal is used to be connected with a first power supply voltage, and
   the reset control circuit comprises a first terminal connected with the write-in control circuit and a second terminal connected with a second power supply voltage.

2. The pixel circuit according to claim 1, wherein the first light-emitting component, the display control circuit and the erasing control circuit are connected with the first terminal of the write-in control circuit.

3. The pixel circuit according to claim 1, wherein the position signal transmitting circuit is connected with the first terminal of the write-in control circuit.

4. The pixel circuit according to claim 1, wherein the position signal transmitting unit is a position light-emitting diode that transmits the position signal.

5. A handwriting display panel, comprising a plurality of pixel units, and each of the plurality of pixel units comprises the pixel circuit according to claim 1.

6. The pixel circuit according to claim 1, wherein display unit is an organic light-emitting diode display device, an electrochromic display device, an electronic ink display device or a liquid crystal display device.

7. A handwriting display system, comprising a handwriting display panel and an erasing device;
wherein the handwriting display panel comprises a plurality of pixel units, and each of the plurality of pixel units comprises a pixel circuit;
the pixel circuit comprises a write-in control circuit, a light-emitting circuit, a display control circuit and an erasing control circuit,
the write-in control circuit comprises a photosensitive switch, and the photosensitive switch is capable of being turned on under illumination of first light;
the light-emitting circuit comprises a first light-emitting component, and the first light-emitting component is configured to emit the first light to illuminate the photosensitive switch where the photosensitive switch is turned on;
the display control circuit comprises a display unit, and the display unit is configured to perform display operation where the photosensitive switch is turned on; and
the erasing control circuit comprises an induction switch, and the induction switch is controllable to be turned on, to stop the first light-emitting component from emitting light;
the pixel circuit further comprises a position signal transmitting circuit,
the position signal transmitting circuit comprises a position signal transmitting unit, and the position signal transmitting unit is configured to transmit a position signal of the display unit where the photosensitive switch of the write-in control circuit is turned on;
the pixel circuit further comprises a reset control circuit, the reset control circuit comprises a recovery switch circuit, and
the recovery switch circuit is configured to allow the first light-emitting component to emit the first light and allow the position signal transmitting circuit to work where the recovery switch circuit is turned on;
the write-in control circuit comprises a first terminal and a second terminal, the second terminal is used to be connected with a first power supply voltage, and
the reset control circuit comprises a first terminal connected with the write-in control circuit and a second terminal connected with a second power supply voltage;
wherein the erasing device is configured to be capable of allowing the induction switch of the erasing control circuit of the pixel circuit to be turned on, to stop the first light-emitting component from emitting light.

8. The handwriting display system according to claim 7, wherein the erasing device comprises a position signal receiving unit and a position signal storage unit;
where the erasing device performs an erasing function, the position signal receiving unit is configured to receive a position signal of an extinguished display unit, and the position signal storage unit is configured to store the position signal of the extinguished display unit, and the erasing device is configured to recover a luminous state of the display unit according to the position signal of the extinguished display unit.

9. The handwriting display system according to claim 8, wherein the erasing device is configured to perform a recovery instruction where the recovery switch of the reset control circuit is turned on;
the erasing device further comprises a control unit; where the erasing device performs the recovery instruction, the control unit is configured to control the induction switch of the pixel unit which previously does not emit light to be turned on according to the position signal stored in the position signal storage unit and the position signal transmitted by the position signal transmitting unit.

10. The handwriting display system according to claim 9, wherein the induction switch is a photosensitive thin film transistor or a photosensitive diode, and the photosensitive thin film transistor or the photosensitive diode is capable of being turned on under illumination of second light;
the display panel comprises a plurality of regions, and each of the plurality of regions comprises a plurality of pixel units; kinds of position signals emitted by the plurality of pixel units comprised in each of the plurality of regions are different, and kinds of the second light which turn on induction switches of the plurality of pixel units in each of the plurality of regions are different.

11. The handwriting display system according to claim 10, wherein each of the plurality of regions comprises four pixel units, the four pixel units comprised in each of the plurality of regions are in a same arrangement, and where the erasing device contacts the display panel, the erasing device is configured to at most contact four pixel units simultaneously.

12. The handwriting display system according to claim 10, wherein the erasing device further comprises an erasing electrode and a second light-emitting component;
the erasing electrode comprises a first electrode, a second electrode and a spring, and the spring is configured to allow the first electrode and the second electrode to be separate;
where the erasing device contacts the display panel and allows the spring to be compressed, the first electrode is configured to contact the second electrode, the erasing electrode is configured to be turned on, and the second light-emitting component emits the second light.

13. The handwriting display system according to claim 7, further comprising a handwriting pen, wherein the handwriting pen comprises a contact electrode and a third light-emitting component, and the third light-emitting component is configured to emit the first light where the contact electrode is turned on.

14. The handwriting display system according to claim 13, wherein the handwriting pen further comprises a pen point and an extending electrode;
where the pen point contacts the display panel, the pen point is configured to push the extending electrode to contact the contact electrode, and the third light-emitting component emits the first light.

15. The handwriting display system according to claim 13, wherein the handwriting pen further comprises a press button, and the press button is configured to turn on the contact electrode where the press button is closed.

16. A handwriting display panel, comprising a plurality of regions, wherein each of the plurality of regions comprises a plurality of pixel units; each of the plurality of pixel units comprises a pixel circuit, the pixel circuit comprises a write-in control circuit, a light-emitting circuit, a display control circuit and an erasing control circuit, the write-in control circuit comprises a photosensitive switch, and the photosensitive switch is capable of being turned on under illumination of first light;

the light-emitting circuit comprises a first light-emitting component, and the first light-emitting component is configured to emit the first light to illuminate the photosensitive switch where the photosensitive switch is turned on;

the display control circuit comprises a display unit, and the display unit is configured to perform display operation where the photosensitive switch is turned on; and the erasing control circuit comprises an induction switch, and the induction switch is controllable to be turned on, to stop the first light-emitting component from emitting light;

the pixel circuit further comprises a position signal transmitting circuit, the position signal transmitting circuit comprises a position signal transmitting unit, and the position signal transmitting unit is configured to transmit a position signal of the display unit where the photosensitive switch of the write-in control circuit is turned on;

the pixel circuit further comprises a reset control circuit, the reset control circuit comprises a recovery switch circuit, and the recovery switch circuit is configured to allow the first light-emitting component to emit the first light and allow the position signal transmitting circuit to work where the recovery switch circuit is turned on;

and pixel circuits of the plurality of pixel units in a same region share a same reset control circuit.

* * * * *